(12) United States Patent
Mantor

(10) Patent No.: US 9,098,932 B2
(45) Date of Patent: *Aug. 4, 2015

(54) GRAPHICS PROCESSING LOGIC WITH VARIABLE ARITHMETIC LOGIC UNIT CONTROL AND METHOD THEREFOR

(75) Inventor: Michael Mantor, Orlando, FL (US)

(73) Assignee: ATI Technologies ULC, Markham (CA)

( * ) Notice: Subject to any disclaimer, the term of this patent is extended or adjusted under 35 U.S.C. 154(b) by 668 days.

This patent is subject to a terminal disclaimer.

(21) Appl. No.: 11/161,674

(22) Filed: Aug. 11, 2005

(65) Prior Publication Data

US 2006/0053189 A1    Mar. 9, 2006

Related U.S. Application Data

(60) Provisional application No. 60/600,943, filed on Aug. 11, 2004.

(51) Int. Cl.
*G06T 15/00* (2011.01)
*G06F 11/20* (2006.01)

(52) U.S. Cl.
CPC .......... *G06T 15/005* (2013.01); *G06F 11/2028* (2013.01); *G06F 11/2038* (2013.01); *G06F 11/2048* (2013.01)

(58) Field of Classification Search
USPC ........... 345/501, 505, 506, 514, 520, 502, 50; 364/232.21, 931.51; 382/162; 395/375, 395/410, 427, 800; 708/490; 714/12, 31, 714/39, 43, 726, 727, 733, 756; 365/200
See application file for complete search history.

(56) References Cited

U.S. PATENT DOCUMENTS

| | | | |
|---|---|---|---|
| 4,435,782 A * | 3/1984 | Kaufman et al. | 708/230 |
| 4,546,428 A | 10/1985 | Morton | |
| 5,253,308 A | 10/1993 | Johnson | |
| 5,513,354 A * | 4/1996 | Dwork et al. | 718/106 |
| 5,517,666 A * | 5/1996 | Ohtani et al. | 712/3 |
| 5,748,872 A | 5/1998 | Norman | |
| 5,867,723 A | 2/1999 | Chin et al. | |
| 6,021,511 A | 2/2000 | Nakano | |
| 6,044,448 A * | 3/2000 | Agrawal et al. | 712/9 |
| 6,073,185 A | 6/2000 | Meeker | |
| 6,205,515 B1 * | 3/2001 | Huang | 711/104 |
| 6,308,252 B1 * | 10/2001 | Agarwal et al. | 712/22 |
| 6,505,306 B1 | 1/2003 | Blackmon et al. | |
| 6,785,841 B2 | 8/2004 | Akrout et al. | |
| 6,792,560 B2 | 9/2004 | Francis et al. | |
| 6,956,576 B1 * | 10/2005 | Deering et al. | 345/475 |
| 7,124,318 B2 | 10/2006 | Luick | |
| 7,577,869 B2 | 8/2009 | Mantor et al. | |
| 2001/0008563 A1 * | 7/2001 | Yamaura et al. | 382/162 |
| 2002/0019841 A1 * | 2/2002 | Kiuchi et al. | 708/490 |
| 2002/0157066 A1 * | 10/2002 | Marshall et al. | 716/1 |

(Continued)

*Primary Examiner* — Jeffrey Chow
(74) *Attorney, Agent, or Firm* — Faegre Baker Daniels LLP

(57) ABSTRACT

Briefly, graphics data processing logic includes a plurality of parallel arithmetic logic units (ALUs), such as floating point processors or any other suitable logic, that operate as a vector processor on at least one of pixel data and vertex data (or both) and a programmable storage element that contains data representing which of the plurality of arithmetic logic units are not to receive data for processing. The graphics data processing logic also includes parallel ALU data packing logic that is operatively coupled to the plurality of arithmetic logic processing units and to the programmable storage element to pack data only for the plurality of arithmetic logic units identified by the data in the programmable storage element as being enabled.

5 Claims, 15 Drawing Sheets

(56) References Cited

U.S. PATENT DOCUMENTS

| | | |
|---|---|---|
| 2002/0174318 A1 | 11/2002 | Stuttard et al. |
| 2003/0115500 A1* | 6/2003 | Akrout et al. .................. 714/10 |
| 2003/0164840 A1* | 9/2003 | O'Driscoll .................... 345/611 |
| 2003/0179631 A1* | 9/2003 | Koob et al. .................. 365/200 |
| 2003/0204805 A1* | 10/2003 | Prabhu .......................... 714/756 |
| 2005/0030312 A1* | 2/2005 | Boyd et al. .................... 345/522 |
| 2005/0275657 A1* | 12/2005 | Hutchins et al. .............. 345/506 |
| 2006/0053188 A1 | 3/2006 | Mantor et al. |
| 2010/0017652 A1 | 1/2010 | Mantor et al. |

\* cited by examiner

ALU (VECTOR SCALAR PROCESSOR)

| ROM:ROM_BAD_PIPE_FUSE_REG · [R/W] · 32 BITS · ACCESS: 8/16/32 · ROMDEC:0X1A0 | | | |
|---|---|---|---|
| DESCRIPTION: *STATE OF LASER FUSE DISABLE BITS* | | | |
| DESCRIPTION | BITS | DEFAULT | |
| EN_RSP_FUSE (ACCESS: R) | 31 | NONE | ENABLE REDUNDANT SP UNIT USAGE |
| EN_RSP_ALL_SIMD_FUSE (ACCESS: R) | 30 | NONE | ENABLE REDUNDANT SP UNIT USAGE FOR ALL SIMD'S WHEN ENABLED – SET FOR DESIGNS THAT HAVE A REDUNDANT SP (INCLUDES MULTIPLE SIMD VECTOR PIPES) |
| RSP_SIMD_SEL_FUSE (ACCESS: R) | 29:28 | NONE | CONTROL BIT, REDUNDANT SIMD SELECTION |
| RSP_PIPE_SEL_FUSE (ACCESS: R) | 27:24 | NONE | CONTROL BIT, REDUNDANT PIPE SELECTION |
| LASER_FUSES (ACCESS: R) | 20:0 | NONE | SIMD3 SP7-6, SP5-4, SP3-2, SP1-0, SIMD2 SP7-6, SP5-4, SP3-2, SP1-0, SIMD1 SP7-6, SP5-4, SP3-2, SP1-0 CONTROL BIT, SP7-6, SP5-4, SP3-2, SP1-0, MC3, MC2, MC1, MC0 |

| ROM:ROM_BAD_PIPE_DISABLE_REGISTER · [R/W] · 32 BITS · ACCESS: 8/16/32 · ROMDEC:0X194 | | | |
|---|---|---|---|
| DESCRIPTION: *DISABLE MEMORY CHANNELS* | | | |
| FIELD NAME | BITS | DEFAULT | DESCRIPTION |
| EN_RSP | 31 | NONE | ENABLE REDUNDANT SP UNIT USAGE |
| EN_RSP_ALL_SIMD | 30 | NONE | ENABLE REDUNDANT SP UNIT USAGE FOR ALL SIMD'S WHEN ENABLED – SET FOR DESIGNS THAT HAVE A REDUNDANT SP (INCLUDES MULTIPLE SIMD VECTOR PIPES) |
| RSP_SIMD_SEL | 29:28 | NONE | CONTROL BIT, REDUNDANT SIMD SELECTION |
| RSP_PIPE_SEL | 27:24 | NONE | CONTROL BIT, REDUNDANT PIPE SELECTION |
| SPARE | 23:4 | NONE | |
| DISABLE_MC | 3:0 | NONE | DISABLE {MC3, MC2, MC1, MC0} |

FIG. 11

| ROM:ROM_SIMD_PIPE_DISABLE_REGISTER · [R/W] · 32 BITS · ACCESS: 8/16/32 · ROMDEC:0X1A8 | | | |
|---|---|---|---|
| DESCRIPTION: *DISABLE PIPES* | | | |
| FIELD NAME | BITS | DEFAULT | DESCRIPTION |
| DISABLE_SIMD0_VTX | 3:0 | NONE | DISABLE VERTEX FOR SIMD0 {SP7 -6, SP5-4, SP3-2, SP1-0} |
| DISABLE_SIMD0_PIX | 7:4 | NONE | DISABLE PIXEL FOR SIMD0 {SP7 -6, SP5-4, SP3-2, SP1-0} |
| DISABLE_SIMD1_VTX | 11:8 | NONE | DISABLE VERTEX FOR SIMD1 { SP7-6, SP5-4, SP3-2, SP1-0} |
| DISABLE_SIMD1_PIX | 15:12 | NONE | DISABLE PIXEL FOR SIMD1 {SP7 -6, SP5-4, SP3-2, SP1-0} |
| DISABLE_SIMD2_VTX | 19:16 | NONE | DISABLE VERTEX FOR SIMD2 {SP7 -6, SP5-4, SP3-2, SP1-0} |
| DISABLE_SIMD2_PIX | 23:20 | NONE | DISABLE PIXEL FOR SIMD2 {SP7 -6,SP5-4, SP3-2, SP1-0} |
| DISABLE_SIMD3_VTX | 27:24 | NONE | RESERVED - DISABLE VERTEX FOR SIMD3 {SP7-6, SP5-4, SP3-2, SP1-0} |
| DISABLE_SIMD3_PIX | 31:28 | NONE | RESERVED - DISABLE VERTEX FOR SIMD3 {SP7-6, SP5-4, SP3-2, SP1-0} |

GRAPHICS PROCESSING LOGIC WITH VARIABLE ARITHMETIC LOGIC UNIT CONTROL AND METHOD THEREFOR

RELATED APPLICATIONS

This application claims the benefit of U.S. Provisional Application Ser. No. 60/600,943 filed Aug. 11, 2004, entitled "GRAPHICS PROCESSING LOGIC WITH VARIABLE ARITHMETIC LOGIC UNIT CONTROL AND METHOD THEREFOR", having as an inventor Michael Mantor, and owned by instant assignee and hereby incorporated by reference in its entirety and is related to co-pending U.S. application Ser. No. 12/509,803 filed Jul. 27, 2009, entitled "APPARATUS WITH REDUNDANT CIRCUITRY AND METHOD THEREFOR", having as an inventors Michael J. Mantor et al., which is a continuation of U.S. application Ser. No. 11/161,672 (now U.S. Pat. No. 7,577,869), filed Aug. 11, 2005, entitled "APPARATUS WITH REDUNDANT CIRCUITRY AND METHOD THEREFOR", having as an inventors Michael J. Mantor et al., which claims the benefit of U.S. Provisional Application Ser. No. 60/600,942 filed Aug. 11, 2004, entitled "APPARATUS WITH REDUNDANT CIRCUITRY AND METHOD THEREFOR", having as an inventors Michael J. Mantor et al., owned by instant assignee and hereby incorporated by reference in its entirety.

FIELD OF THE INVENTION

The invention relates generally to graphics data processing devices and methods, and more particularly to graphics data processing apparatus and methods that provide variable level processing to vary the processing power of a graphics processor and/or providing continued operation due to defective ALUs within a graphics processing device, and/or to methods and apparatus that provide power reduction by controlling clock signals to one or more logic units.

BACKGROUND OF THE INVENTION

In order to provide differing performance levels for a system or subsystem, some graphics processing devices have control circuitry that allows, for example, entire graphics processing pipelines to be selectively switched in or switched out to provide a higher level of performance or a lower level of performance so that different product performance levels can be achieved using a common die for example. However, the level of granularity of performance control is typically very high. For example, an entire pipeline is usually capable of being selectively enabled or disabled to allow for more or fewer graphics pipelines to be used on a given die. It is also known to provide the performance selection or enabling the respective pipelines through a programmable register set that may be programmed, for example, through a suitable driver application executing on a host processor.

However, it would be desirable to have a graphics processor or graphics processing circuitry that would allow a finer granularity of performance control. In addition, it would be desirable to reduce power consumption on a dynamic basis at a suitable granularity level.

DETAILED DESCRIPTION OF THE DRAWINGS

The invention will be more readily understood in view of the following description when accompanied by the below figures and wherein like reference numerals represent like elements:

Figure 13:
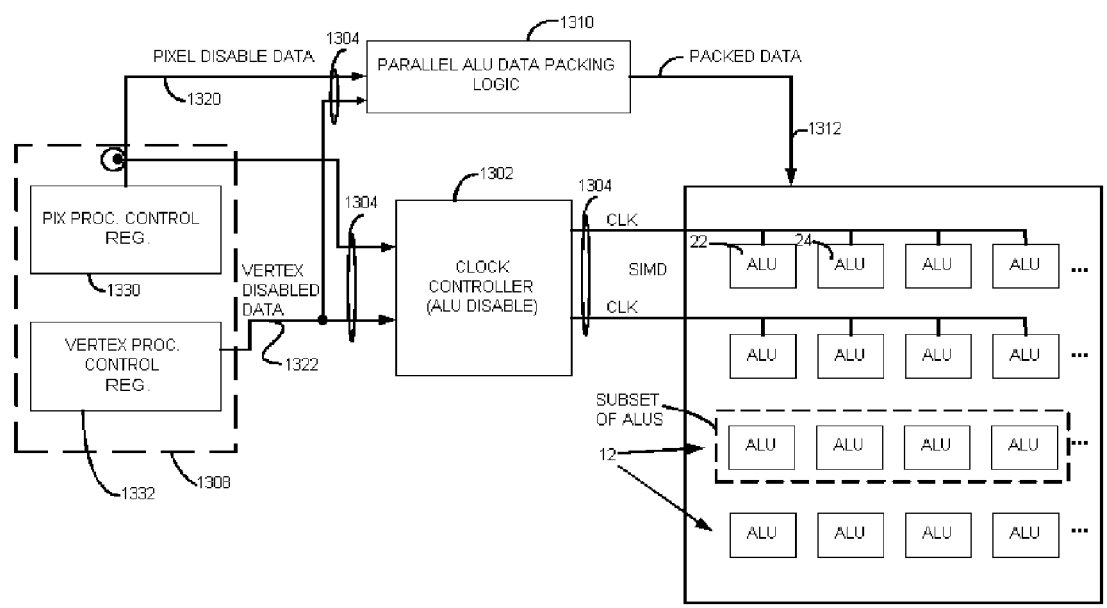
Figure 14:
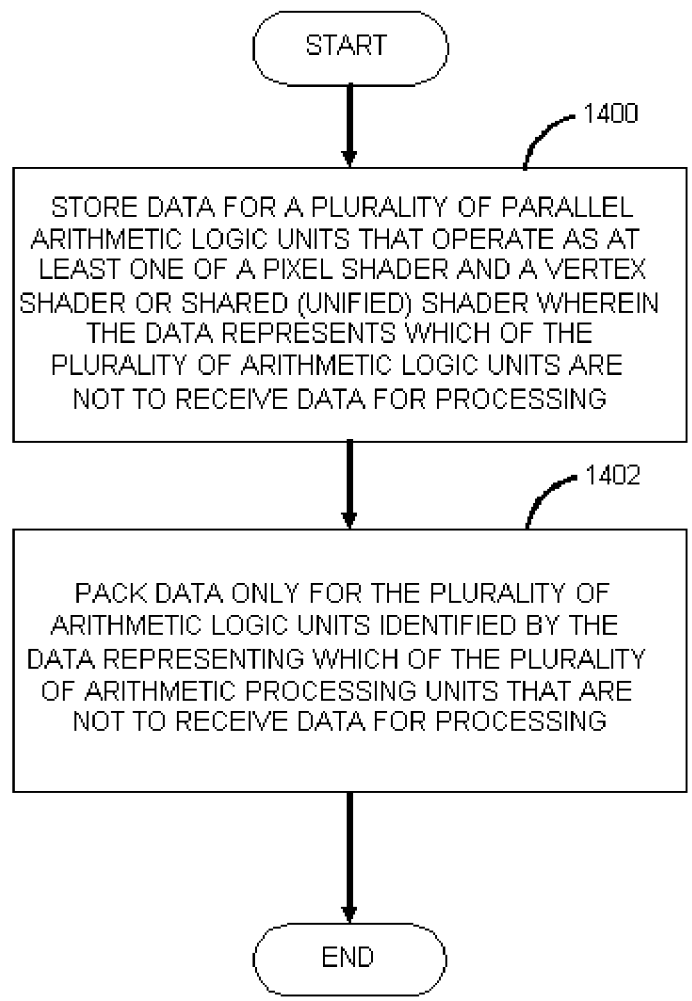
Figure 15:
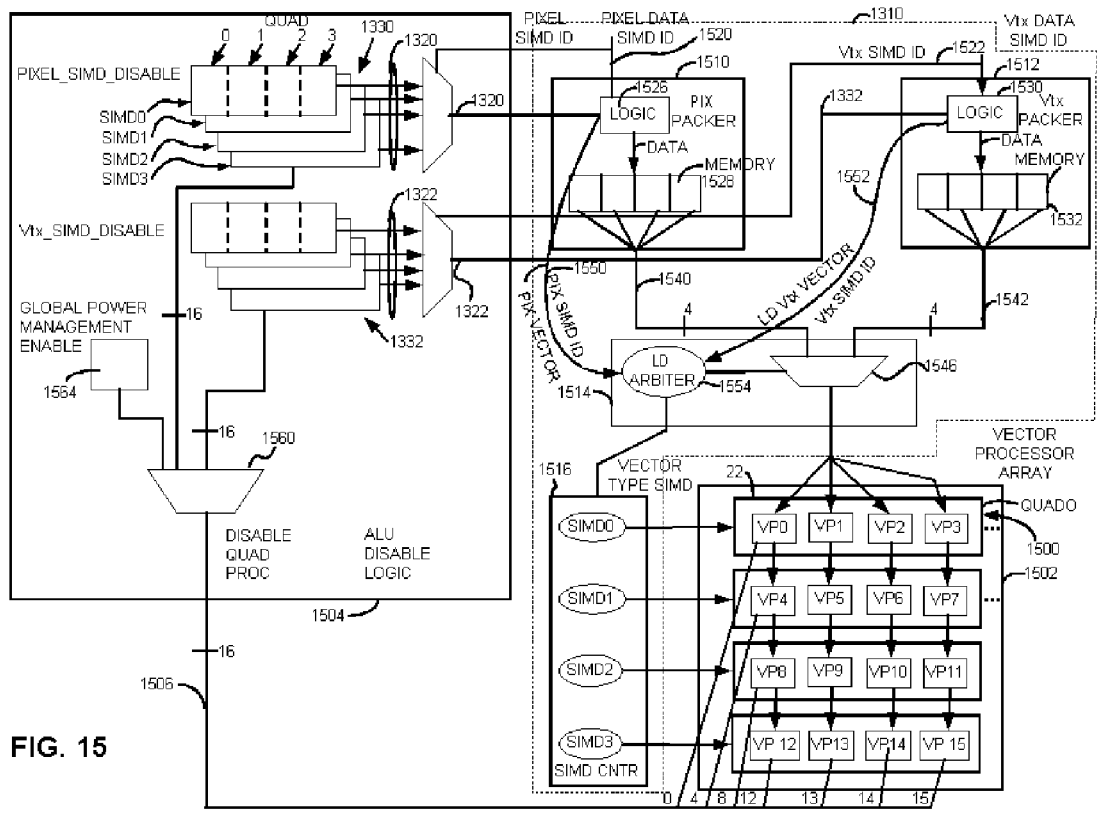
Figure 16:
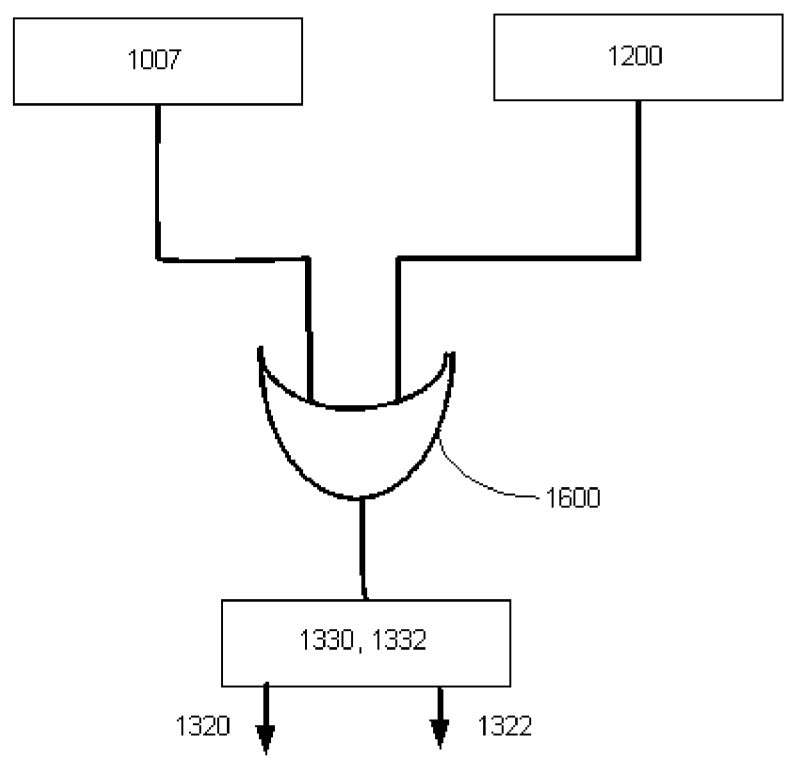

FIG. 11 is a diagram illustrating in table form description of memory contents for controlling the connection of a redundant circuit in accordance with one embodiment of the invention; and FIG. 12 is a diagram illustrating in table form description of memory contents for controlling the connection of a redundant circuit in accordance with one embodiment of the invention and other figures and description in the included specification;

FIG. 13 is a functional block diagram illustrating one example of a graphics data processing logic in accordance with one embodiment of the invention;

FIG. 14 is a flowchart illustrating one example of a method for processing graphics data in accordance with one embodiment of the invention;

FIG. 15 is a functional block diagram illustrating one example of graphics data processing logic in accordance with one embodiment of the invention; and FIG. 16 is a functional block diagram illustrating one example of logic to selectively disable ALUs of a processor in accordance with one embodiment of the invention.

DETAILED DESCRIPTION OF THE PREFERRED EMBODIMENT

Briefly, graphics data processing logic includes a plurality of parallel arithmetic logic units (ALUs), such as floating point processors or any other suitable logic, that operate as a vector processor on at least one of pixel data and vertex data (or both) and a programmable storage element that contains data representing which of the plurality of arithmetic logic units are not to receive data for processing. The graphics data processing logic also includes parallel ALU data packing logic that is operatively coupled to the plurality of arithmetic logic processing units and to the programmable storage element to pack data only for the plurality of arithmetic logic units identified by the data in the programmable storage element as being enabled.

In one embodiment, a subset of ALUs out of the plurality of parallel ALUs are effectively disabled and the parallel ALU data packing logic packs data only for the subsets of ALUs identified as being able to receive data. In another embodiment, enable logic may be provided for each of the ALUs to provide a per-ALU disabling control level.

In another embodiment, a clock signal to one or more of the plurality of ALUs is disabled to reduce power consumption when the ALUs do not need to be used for processing data.

A method is also disclosed that includes storing data for a plurality of parallel ALUs that operate as vector processors that process at least one of pixel data and vertex data wherein the data represents which of the plurality of arithmetic logic units are not to receive data for processing. The method includes also packing data only for the plurality of arithmetic logic units identified by the stored data as being allowed to receive data. It is noted there may be an enable bit that controls, for example, a subset of ALUs, such as four ALUs together to allow groups of parallel ALUs within a pipeline to be disabled or enabled as opposed to an entire pipeline for example. In addition, if desired, fuses may be used to hardwire the disabling of particular parallel ALUs as opposed to or in addition to using programmable registers. The programmable registers may be programmed through a suitable driver executing on a host processor, or any other suitable processor and may be controlled to activate or deactivate subsets of parallel ALUs to facilitate power reduction or reduce or increase the performance level of a graphics processor. For example, during low power conditions, the processing configuration of the graphics processor may be readily changed under software control through a programmable register set.

Also in one embodiment, the parallel ALU data packing logic only packs data for a given row of parallel processors, for example, a subset of quad processors based on register values that indicate which subset of processors are enabled. Clock control logic is provided, for example, for each quad processor or other subset of processors since in one embodiment a same subset of parallel ALUs are used both for processing pixel data and for processing vertex data. As such, the clock control logic does not shut the clock off to the subset unless two conditions are met. For example, the clock is shutoff only when bits in the register set indicate that the subset of quad processors is disabled for both pixel processing and vertex processing.

An apparatus with circuit redundancy includes a set of parallel arithmetic logic units (ALUs), a redundant parallel ALU, input data shifting logic that is coupled to the set of parallel ALUs and that is operatively coupled to the redundant parallel ALU. The input data shifting logic shifts input data for a defective ALU, in a first direction, to a neighboring ALU in the set. When the neighboring ALU is the last or end ALU in the set, the shifting logic continues to shift the input data for the end ALU that is not defective, to the redundant parallel ALU. The redundant parallel ALU then operates on a unit of work for the defective ALU, but not necessary the same data set as the defective unit unless it was the last of a set of ALUs. Output data shifting logic is coupled to an output of the parallel redundant ALU and all other ALU outputs to shift the output data in a second and opposite direction than the input shifting logic, to realign output of data for continued processing, including for storage or for further processing by other circuitry. As such, once a defective ALU is detected, data for that ALU is then shifted to a neighboring ALU and data for the neighboring ALU is routed to a next neighboring ALU and so on until an end ALU is reached where after the data destined for the end ALU is then passed to the redundant ALU for processing. The shifting logic may be dynamically controlled each time the defective ALU is to be used or more statically such as once after testing determines which ALU is defective.

A method is also disclosed that includes storing data representing which ALU is defective, such as one or more registers identifying column and row information regarding an ALU that is in a two dimensional array, or any other suitable identification data. The method also includes receiving input data for a group of parallel ALUs, shifting input data for the defective ALU in the first direction to a neighboring ALU and all subsequent ALUs in the group and from the end ALU in the group (e.g. subset) to a redundant ALU. The method also includes shifting output data from the redundant ALU and all other ALU outputs in a second direction to realign output to correct data path flow for the ALU array caused by the shifting of the input data.

In another embodiment, a set of parallel ALUs are divided into a plurality of subsets of parallel ALUs. Data shifting logic associated with each of the subset is employed and is operative to shift input data to a neighboring parallel ALU in a subset. Multiplexing logic is operatively coupled to the subset based data shifting logic and also coupled to the redundant parallel ALU, to receive data destined from an end ALU in each of the subsets of parallel ALUs. This may be advantageous where ALU circuitry for groups of ALUs are located in proximity to one another on an integrated circuit die to help reduce the wiring complexity and number of connections that need to be made to facilitate use of the redundant ALU if any of the parallel ALUs is defective. Also in this embodiment, output data shifting logic is also grouped in subsets and receives data output from the parallel redundant ALU and all other ALU outputs to shift the output data in a second and opposite direction to realign output of data for continued processing.

In another embodiment, a two dimensional array of arithmetic logic units are logically arranged to have multiple sets of horizontal parallel ALUs that receive or output data in a common cycle. In one example, the ALUs are made up of a plurality of single instruction multiple data (SIMD) processors that each include a set of parallel vector scalar processors. However, it will be recognized that any suitable ALUs may be employed. A single redundant ALU may be switched in for any of the ALUs in the two dimensional array of arithmetic logic units. Among other advantages, increased yields may be achieved with relatively low cost circuit redundancy since an entire SIMD processor need not be replicated as a redundant circuit but instead a subcomponent of the SIMD processor may be duplicated. In addition, the wiring complexity can be substantially reduced by grouping and shifting input/output data to multiple neighboring ALUs. In one embodiment, the shifting logic includes multiplexing logic that includes a bank of multiplexors. However any suitable switching structure may be employed.

Figure 1:
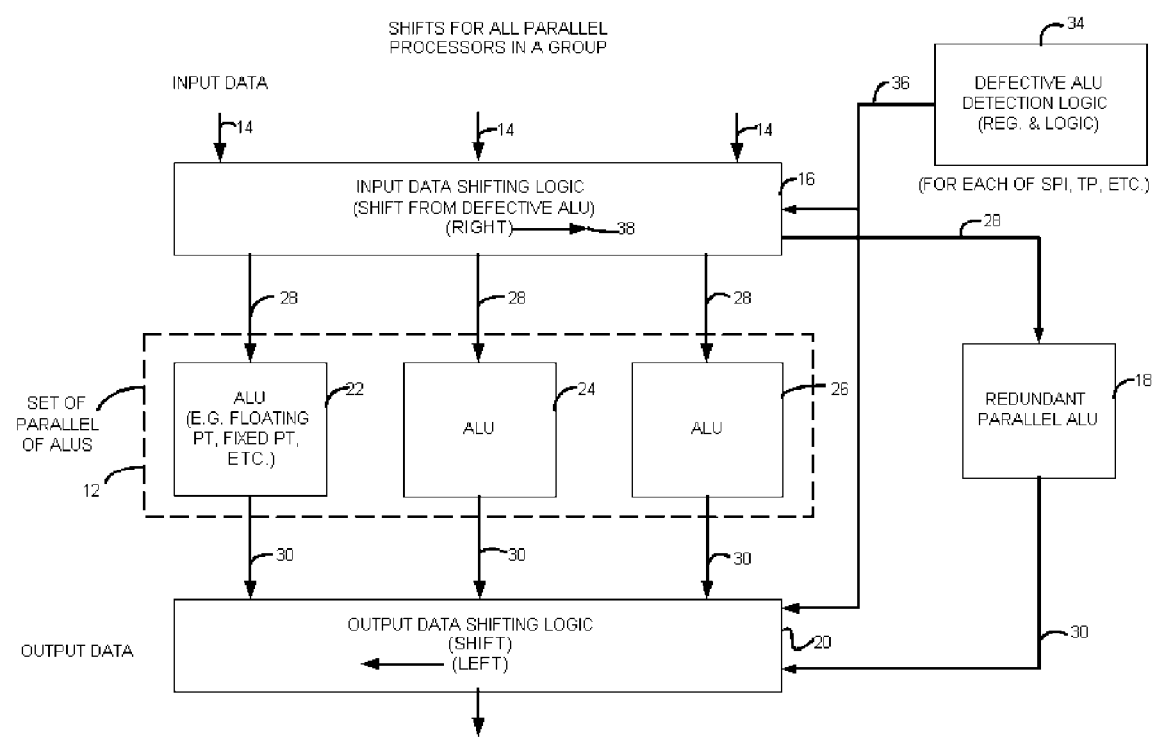
FIG. 1 is a block diagram illustrating one example of an apparatus with circuit redundancy in accordance with one embodiment of the invention.

FIG. 1 is a block diagram illustrating one example of an apparatus 10, such as a graphics processor, central processing unit, digital signal processor, or any other suitable logic unit. In this example, a set of parallel ALUs 12 receive their respective input data 14 through shifting logic 16. The input data 14 may come from any suitable source such as a previous processing stage, or any other suitable source. The apparatus 10 also includes a parallel redundant ALU 18 and output data shifting logic 20. The redundant parallel ALU 18 is connected in a parallel relationship with the ALUs in the set of parallel ALUs 12. Each of the parallel ALUs 22, 24 and 26 receive input data 28 through the input data shifting logic 16 via suitable connections, such as a bus or any other suitable communication channel(s). Each of the parallel ALUs 22, 24 and 26 generate output data 30 respectively to the output data shifting logic 20. The ALUs may be any suitable arithmetic logic units including, but not limited to, floating point ALUs, fixed point ALUs, any suitable combination thereof, vector processors, vector scalar processors, shaders or any other suitable circuitry for performing one or more arithmetic operations. One example of a shader may be found in co-pending application entitled GRAPHICS PROCESSING ARCHITECTURE EMPLOYING A UNIFIED SHADER, U.S. Pat. No. 6,897,871, issued May 24, 2005, incorporated herein by reference, although any suitable logic may be used.

The apparatus 10 also includes defective ALU detection logic 34 which may simply be memory such as registers or other memory element(s) that includes data that represents which of the parallel ALUs 22, 24 or 26 is defective and that serves as control data to control the shifting of data as described herein. In this example, the defective ALU detector logic 34 generates control data 36 to control input data shifting logic 16 and output shifting logic 20. The defective ALU detector logic 34 may also include test logic to test each of the ALUs individually to determine if any of the ALUs are defective.

The input data shifting logic 16 is controlled to shift input data 14 for a defective ALU in a first direction, such as in the direction shown by the arrow 38 for a defective ALU, to a next neighboring ALU in the set of parallel arithmetic logic units 12. For purposes of illustration only, it will be assumed that ALU 24 has been detected as being defective. Accordingly, the input data shifting logic 16 will be controlled by the defective ALU detector 34 to shift the input data 14 destined for ALU 24 to ALU 26. The input data 14 destined for ALU 26 then gets shifted to the redundant parallel ALU 18. The ALU 26 is considered an end non-defective ALU in the set, in this example. In this example, the shifting logic 16 would not shift data for ALU 22 since this ALU is not defective. As such, only ALUs to the right of the defective ALU will have their input data switched to another ALU or to the redundant parallel ALU 18. The redundant parallel ALU 18 is a copy of the ALUs 22, 24, and 26. Accordingly it will process the input data 28 that has been shifted accordingly and provide output data 30 to the output shifting logic. It will be recognized that in an alternative embodiment the shifting may be to the left.

As shown, the defective ALU detector control logic 34 also controls the output data shifting logic 20 which receives the output data from the redundant parallel ALU 18 and each of the parallel ALU units 22, 24, 26 and subsequently is controlled to shift the output data 30 in a second and opposite direction (in this case to the left) to realign output data for continued processing. The ALU detection control logic 34 may be any suitable logic that provides the memory control of the shifting logic. For example, since each of the ALUs may be passing data to another stage in a pipeline, the rest of the pipeline is not affected since the output data shifting logic 20 realigns the data flow caused by the input data shifting logic 16.

Figure 2:
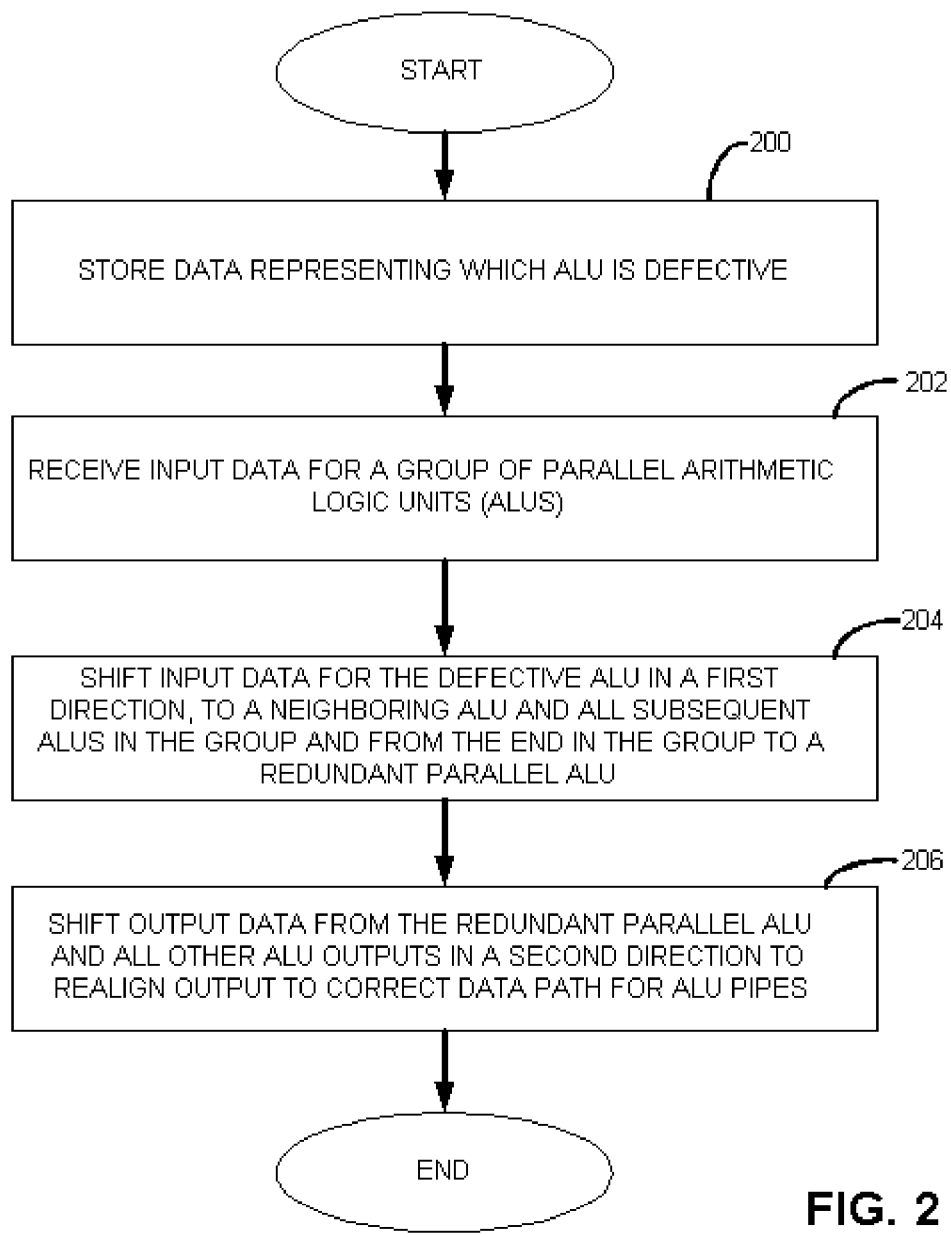
FIG. 2 is a flowchart illustrating one example of a method for providing circuit redundancy in accordance with one embodiment of the invention.

FIG. 2 illustrates one example of a method for providing circuit redundancy which as shown block 200 includes storing data representing which ALU is defective. For example, a test operator at a manufacturing facility may write to an on board register indicating which of the ALUs 22, 24, 26 failed to pass a particular test or may activate (blow) fuse bits to permanently control the shifting logic. Alternatively, the data may be automatically programmed by the apparatus 10 if a self test is performed. As shown in block 202, the method includes receiving input data 14 for a group or set of parallel arithmetic logic units, such as by the input data shifting logic 16. As shown in block 204, the method includes shifting the input data for the defective ALU in a first direction to a neighboring ALU and all subsequent neighboring ALUs in the same direction in the group. This may also include shifting the input from the end ALU, such as ALU 26 to the redundant parallel ALU 18. In this fashion, the defective ALU does not need to process input data and the redundant ALU may be switched in through a shifting approach to accommodate the defective ALU. The output from the redundant parallel ALU 18 is then shifted, as shown in block 206, from the redundant ALU and for all ALUs whose input data was shifted, in a second direction to realign output data to correct the data path for all affected neighboring circuits in an ALU pipeline if desired. This may be done for example by the output data shifting logic 20. It will be recognized that as described herein any operations, processors or steps may be carried out in any suitable order and that the order described above is just one example.

Storing data representing which ALU is defective may include for example storing a row and column ID if a two dimensional array of ALUs is employed as described later. As noted, the stored data may also be based on, for example, blown fuses that are blown during the testing process to indicate which ALU is defective. Any other suitable mechanism may also be used as desired. The defective ALU detection logic 34 may also include control logic that compares register values indicating which ALU is defective to command data or other ALU identification data that is part of the input data 14 to determine which ALU is being written to so that it may suitably generate the control data 36 to control switching and hence shifting of the data from a defective ALU to a neighboring ALU and to the redundant ALU as needed.

Figure 3:
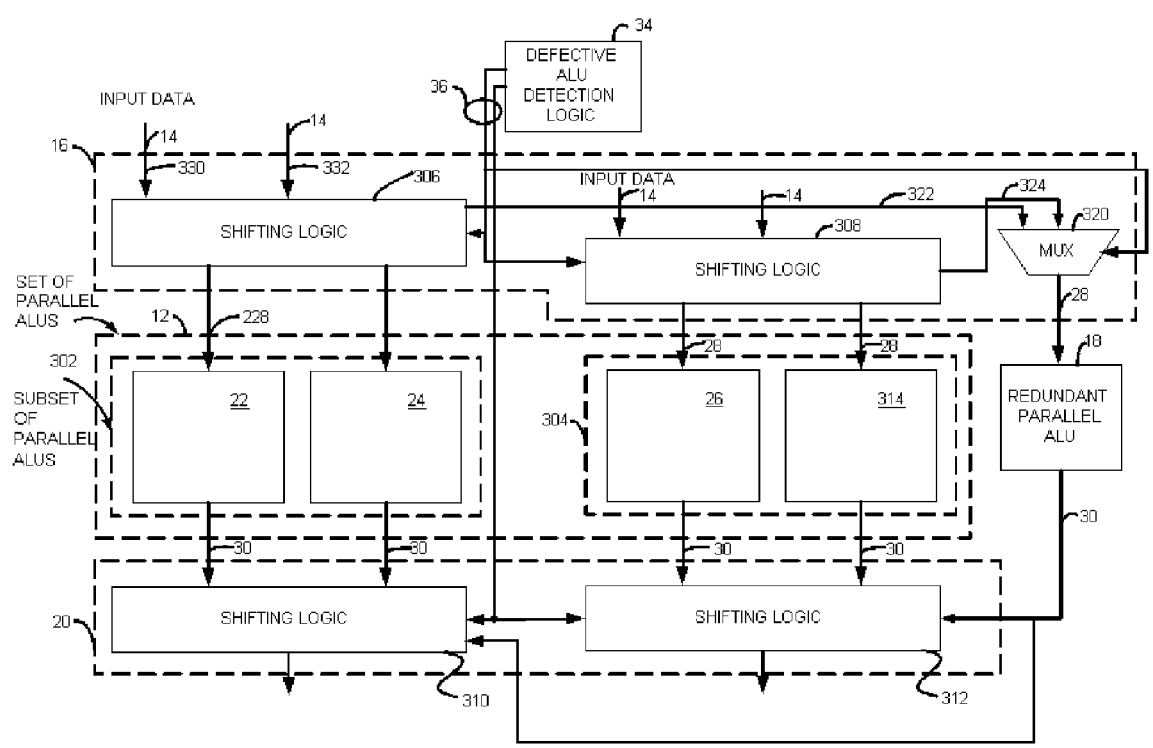
FIG. 3 is a block diagram illustrating one example of an apparatus with circuit redundancy in accordance with one embodiment of the invention.

FIG. 3 illustrates an alternative embodiment of an apparatus 300 with circuit redundancy which is the same type of apparatus shown in FIG. 1 or any other suitable apparatus. In this example the set of parallel ALUs 12 are divided into a plurality of subsets of parallel ALUs 302 and 304. Similarly, the input data shifting logic 16 is also divided into shifting logic 306 and 308 respectively corresponding to each of the subset of parallel ALUs. Also in a like manner, the output data shifting logic 20 is divided into shifting logic sections 310 and 312 wherein each of the shifting logic sections correspond to the subset of parallel ALUs 302 and 304 respectively. Subset of parallel ALUs 304 also includes an ALU 314 identical in structure to the other ALUs in this set of parallel ALUs 12.

Also in this example, the input data shifting logic 16 also includes multiplexing logic 320 that is operatively coupled to receive input data for an end ALU, such as end ALU 24 and end ALU 314 in each of the subset of parallel ALUs 302 and 304. This is shown as data 322 and 324. The multiplexing logic 320 is controlled by a control data 36 from the defective ALU detection logic 34 which selects which input data 14 for each corresponding ALU is actually sent to the redundant parallel ALU 18. The multiplexing logic 320 is coupled to the parallel redundant ALU 18 to provide selected input data from either of the shifting logic 306 or 308, and more particularly for input data destined for end ALU 24 or end ALU 314.

The shifting logic 310 and 312 is also controlled to suitably realign the output data 30 to the appropriate subsequent pipeline processes as determined by the defective ALU detection logic 34. This is done through control data 36. As such the shifting logic 310 and 312 shifts output data in an opposite direction to realign output of the data for continued processing or use.

By way of illustration, if ALU 22 is determined to be defective, the input data 14, in this example shown as input data 330, was originally destined for ALU 22, and is subsequently shifted to be received by ALU 24 by the shifting logic under control of the defective ALU detection logic 34. The input data 332 normally destined for ALU 24 is then passed to multiplexor 320 as data 322 and the defective ALU detection logic 34 controls the multiplexing logic 320 to select data 322 to be processed by the parallel redundant ALU 18. Since the shifting logic 306 and 310 has been divided for the set of parallel ALUs 12, the shifting logic 308 and processing of by ALUs 26 and 314 are not affected. The defective ALU detection logic 34 controls the shifting logic 306 and the multiplexing logic 320 to pass input data 332 to the parallel redundant ALU 18. The multiplexing logic 320 is shown as being operatively coupled to inputs of the plurality of parallel ALUs (such as end ALUs) through the shifting logic 306 and 308 and to the parallel redundant ALU 18. The multiplexing logic 320 is controllable to output the input data 28 destined for one of the ALUs to the redundant parallel ALU.

Figure 4:
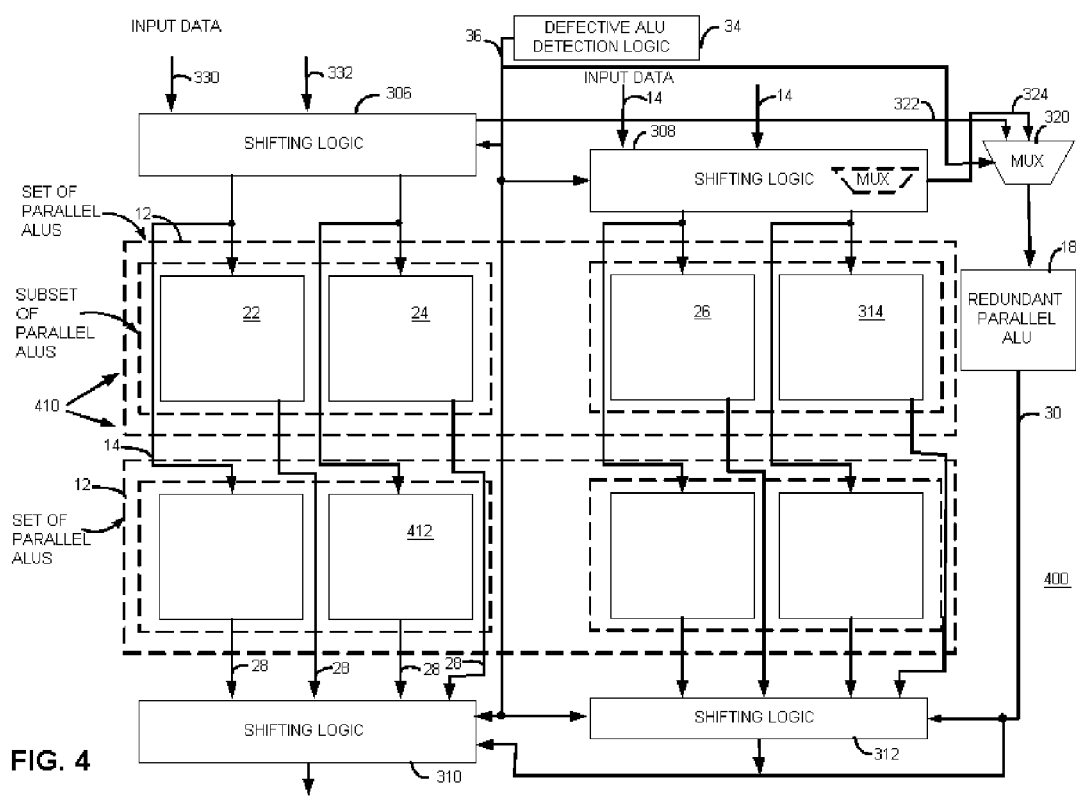
FIG. 4 is a block diagram illustrating another example of an apparatus with circuit redundancy in accordance with one embodiment of the invention.

FIG. 4 illustrates yet another embodiment of an apparatus 400 that operates in a similar manner as described with respect to FIG. 3 except that in this embodiment, the set of parallel ALUs is a two dimensional array of ALUs, shown as a subset of parallel ALUs 410. Each set of ALUs is shown to be logically arranged in a horizontal parallel configuration. Each of the set of horizontal parallel ALUs can receive the input data in a common cycle. By way of example, and not limitation, each of the horizontal sets may be a SIMD processor that includes four parallel ALUs. However it will be recognized that any suitable logic may be employed. In this example, the defective ALU detection logic 34 may contain or access registers that indicate, for example, the X and Y coordinate (i.e. row and column position) of the ALU that is defective. For example, since there are eight ALUs shown in this example, the ALU 412 may be defective. In this case, the input data 14 destined for ALU 412 is shifted and in this instance since it is an end parallel ALU the data destined for 412 would be shifted by shifting logic to the multiplexor 320 and then passed by the multiplexor 320 to the redundant parallel ALU 18 as previously described. As such the structure described herein is applicable to two dimensional arrays of ALUs or any other suitable logic.

Figure 5:
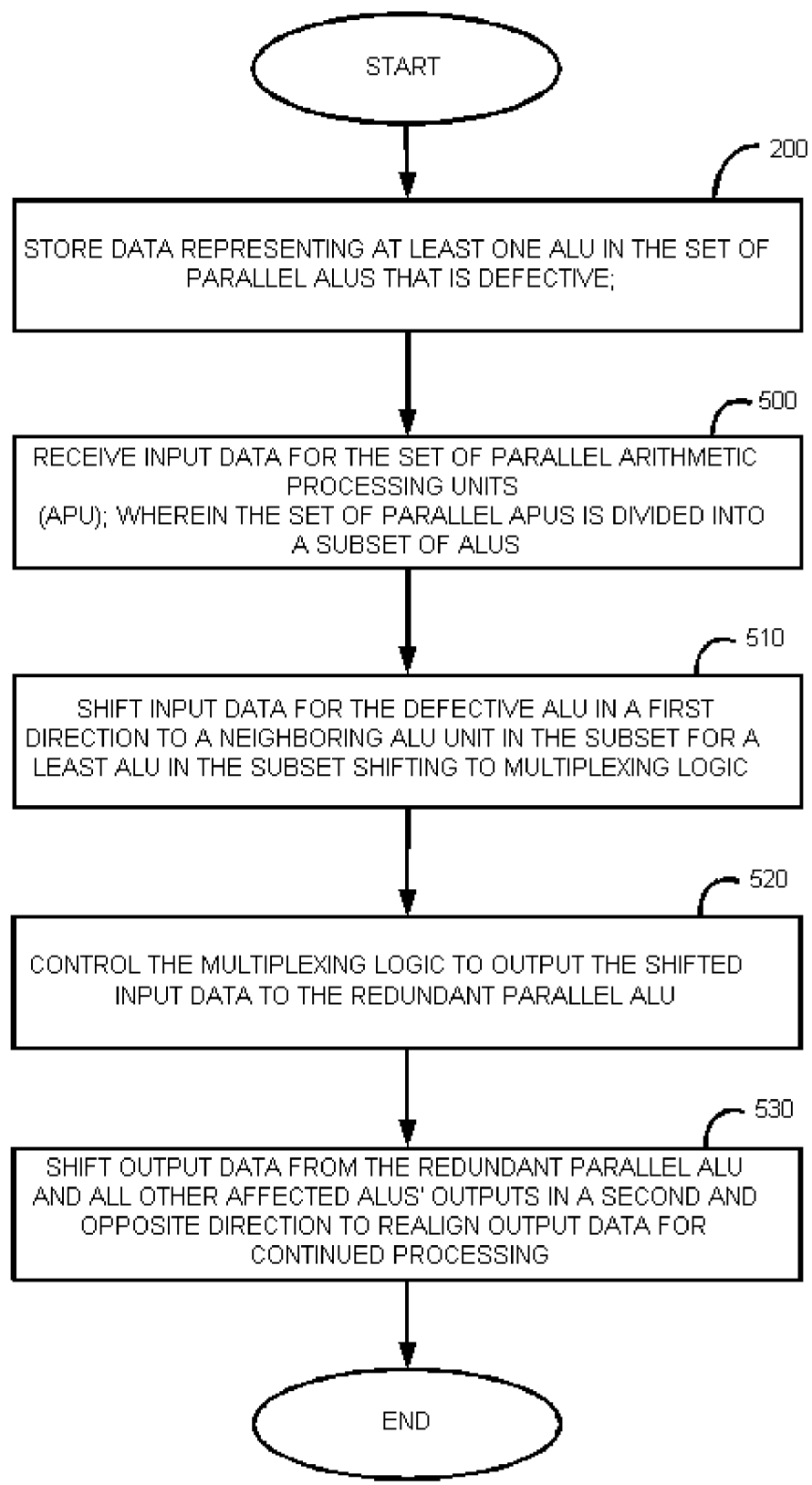
FIG. 5 is a flowchart illustrating one example of a method for providing circuit redundancy in accordance with one embodiment of the invention.

FIG. 5 illustrates a method for providing circuit redundancy as carried out for example by a circuit of FIG. 4 or any other suitable structure. As shown in block 200 the method includes storing data representing at least one ALU in the set of parallel ALUs that is defective such as in a register or any other suitable memory element. Based on this data, the defective ALU detection logic 34 then takes the appropriate action to control the requisite shifting logic (and associated multiplexor circuitry if applicable) to cause shifting of input data to a neighboring ALU in a subset and the redundant parallel ALU 18. For example as shown in block 500, the method includes receiving input data for the set of parallel arithmetic processing units 12 wherein the set of parallel ALUs may be divided into a subset of ALUs, possibly forming a two dimensional array of ALUs. As shown in block 510 the method includes shifting input data for the defective ALU in a first direction, such as to the right, to a neighboring ALU unit in the subset. The method may also include then shifting data normally destined for an end ALU in the subset to the multiplexing logic 320. As shown in block 520, the method includes controlling the multiplexing logic 320 to output the shifted input data to the redundant parallel ALU 18. As shown in block 530 the method includes shifting output data by the shifting logic 310 and 312 for example, from the redundant parallel ALU 18 in an opposite direction to realign output data for continued processing. Again as noted with respect to FIG. 3, limiting the shifting to subsets of parallel devices can reduce the amount of wiring and limit the groups of ALUs affected by the defective ALU. In addition more delay stages may not need to be added since shifting is not provided for all ALUs in this example. Other advantages would be recognized by those with ordinary skill in the art.

Figure 6:
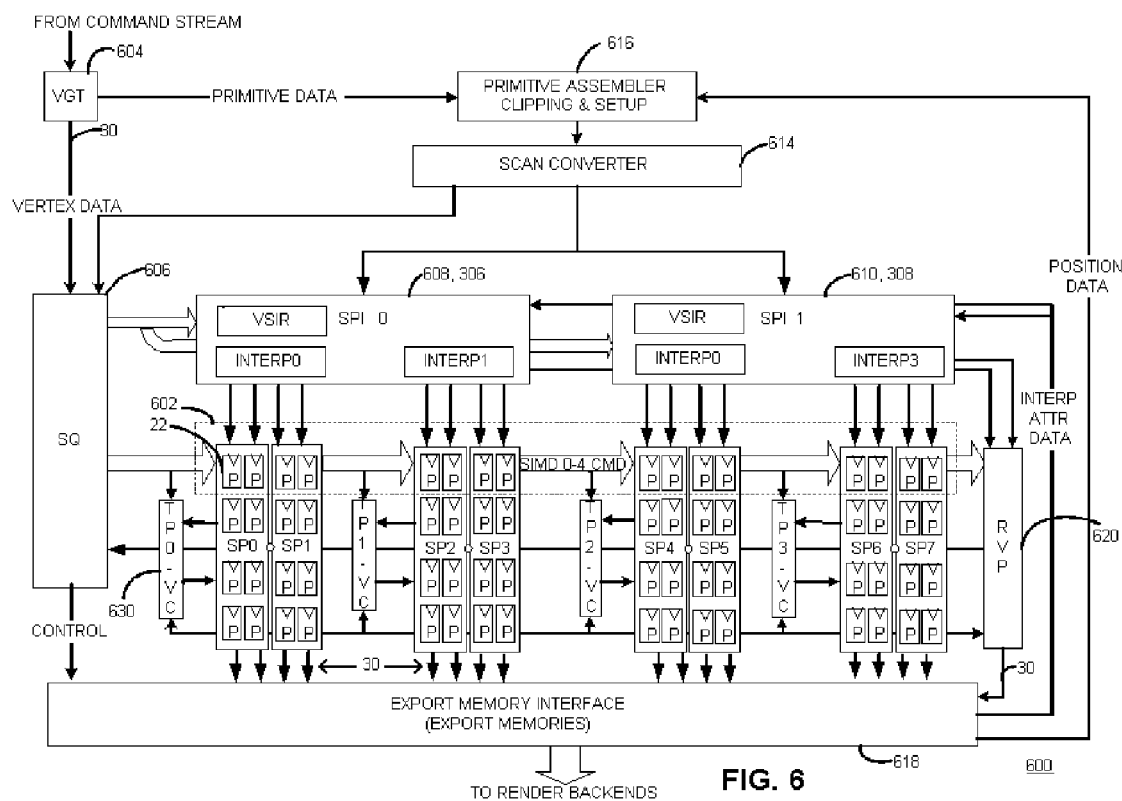
FIG. 6 is a block diagram illustrating one example of an apparatus with circuit redundancy in accordance with one embodiment of the invention.

FIG. 6 illustrates a block diagram of one example of an apparatus 600 such as a graphics processor employing the disclosed redundancy control and operation. It will be understood that this is an illustrative example only and is not intended to be limiting as the described operations and structure may be employed in any suitable apparatus. In the context of a graphics processor, as shown in this example, there are sixty-four ALUs shown which function as shader engines. Each ALU, also referred to as a vector scalar processor, contains a vector processor, that can perform dot product operation or other suitable vector operations as well as a scalar engine that may perform for example sine and cosine operations, square root operations, and other suitable scalar operations. For purposes of illustration, 64 shaders will be described. As shown, 64 of the shaders are organized in 4 sets of 16 wherein each set of 16 is one SIMD processor. As such all 16 engines within an SIMD or set of parallel processing ALUs, are executing the same instruction on different data types each clock cycle. The SIMD processors or sets of parallel ALUs, operate independently and each may be processing different data types (pixels, vertices, primitives, etc) and different groups of data types or even separate shaders if desired. Each SIMD processor shown as 602 may be given for example a vertex vector (group of vertices) or a pixels vector (group of pixel quads i.e. 4 pixels) to process for a single instruction. For example, in this embodiment, each SIMD 602 processes the same instructions across all 16 ALUs.

By way of example only, there are 4 GPRs (General Purpose Register file) per ALU. Each of the 4 GPRs belongs to one ALU and are preferably skewed in their reads (and writes) so for each clock there is a new source A, B and C available to a vector engine. For example, for a single vector/scalar/fetch engine input/output requirements, there can be up to 4 source operands required per clock and up to 4 desired writes per clock. However it will be recognized that any suitable ALU may be employed.

As shown, the apparatus 600 includes a vertex grouper tessellator 604, a sequencer 606, a shader pipe interpolator 608 and 610, shader processors 612, scan converter 614, a primitive assembler 616, export memories 618, and redundant logic 620 that includes the redundant parallel ALUs 18.

The vertex grouper tessellator 604 performs the following primary tasks: it fetches vertex indices from memory, performs vertex index reuse determination such as determining which vertices have already been processed and hence not need to be reprocessed, converts quad primitives and polygon primitives into triangle primitives, and computes tessellation factors for primitive tessellation. Such operations may be performed in any suitable manner including those known in the art.

The sequencer 606 receives the vertex vector data 630 from the VGT 604 and pixel vector data from the scan converter 614. The sequencer 606 is the primary controller for the shader pipe interpolators 608 and 610, the shader processors 612 and the shader export memories 618. The sequencer 606 manages vertex vector and pixel vector operations, vertex and pixel shader input data management, memory allocation for export resources, thread arbitration for multiple SIMDs and resource types, control flow and ALU execution for the shader processors, shader and constant addressing and any other desired control function.

The scan converter 614 performs the task of determining which pixels (and samples) are covered by a given primitive received from the primitive assembly unit 616. The scan converter 614 also performs the per pixel perspective correct barycentric coordinate computation, packing quads of pixels into 16 quads pixel vectors for pixel shading. As such the scan converter may provide control data to the sequencer 606 to define a pixel vector and barycentric coordinates to the shader interpolators 608 and 610 for attribute interpolation to the pixel for pixel shader input data creation.

The primitive assembler 616 receives primitive data as received from the command stream by the VGT and vertex position data from the export interface 618 and may perform clipping, viewpoint transform, and backface culling. The primitive assembly 616 provides surviving primitives to the scan converter 614 for rasterization to create pixels in the primitive to be pixel shaded.

The texture pipe and vertex cache 630 are also operatively coupled to the SIMD processors to service memory fetch request to return the requested data. The texture pipe performs the address calculations for 1d textures, 2d textures, cube maps and 3d volume map based on addresses from the shader pipes and state data from the sequencer to issue fetch requests to memory via an on chip cache to fetch corresponding data. The texture pipe and vertex cache 630 performs texture map decompression and filtering computations prior to staging return data to the shader pipes.

The vertex cache provides a second fetch resource for the SIMD engines. The vertex cache accepts vertex indices from the set of shader pipes that reside in the SIMD processors and state data from the sequencer to perform address calculations for data fetching. If the requested data is not in the cache it will be fetched from memory. The return data can undergo a format conversion prior to loading data back into the requesting SIMD processors. Any such graphic processor could employ one, two or more fetch resources.

The SIMD processor 602 which includes, in this example, a set of parallel ALUs that are divided into subsets in groups of four also are constructed to allow independent control of each of the subsets to facilitate 4, 8, 12 or 16 vector/scalar processor units per SIMD. This control is useful in determining cost and performance tradeoffs as well as allowing smaller functionally equivalent configurations for testing of future derivative products if desired. As noted, however, in this example, the redundant logic 620, is a redundant vector/scalar processing unit that serves as a 65th ALU which is available on the die to replace any one of the 64 ALUs.

As such the ALUs in the SIMD 602 in this example are a bank of floating point unit processors that execute in parallel and each vector scalar processor may be effectively switched out if any one of them are bad.

The shader processor interpolator (SPI) includes input staging storage and preprocessing logic to determine and load input data into the parallel ALU units. To create data per pixel, a bank of interpolators interpolate vertex data per primitive with the scan converter's provided barycentric coordinates to create data per pixel for pixel shaders in a manner as known in the art.

Figure 7:
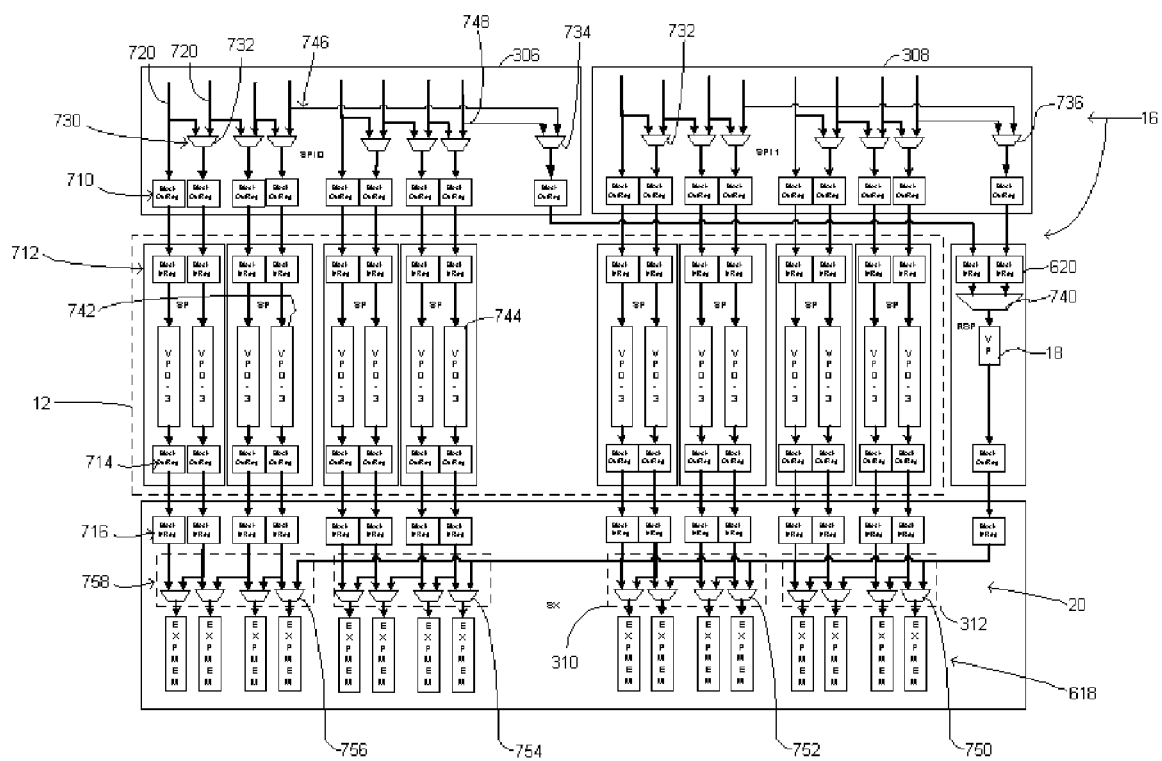
FIG. 7 is a block diagram illustrating one example of an apparatus with circuit redundancy in accordance with one embodiment of the invention.
Figure 8:
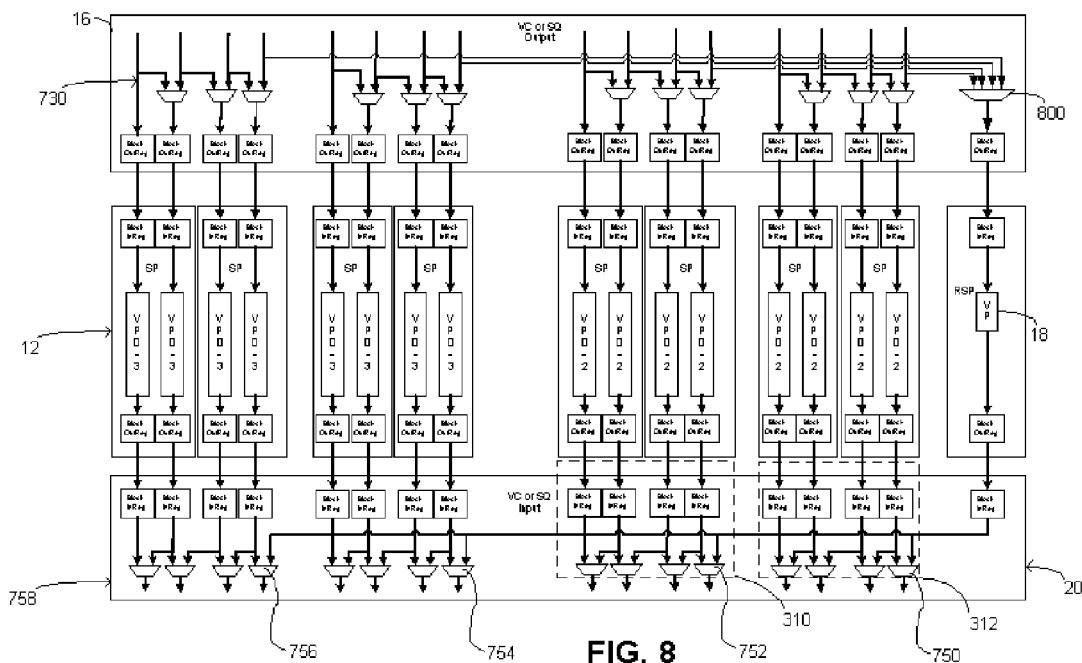
FIG. 8 is a block diagram illustrating one example of an apparatus with circuit redundancy in accordance with one embodiment of the invention.
Figure 9:
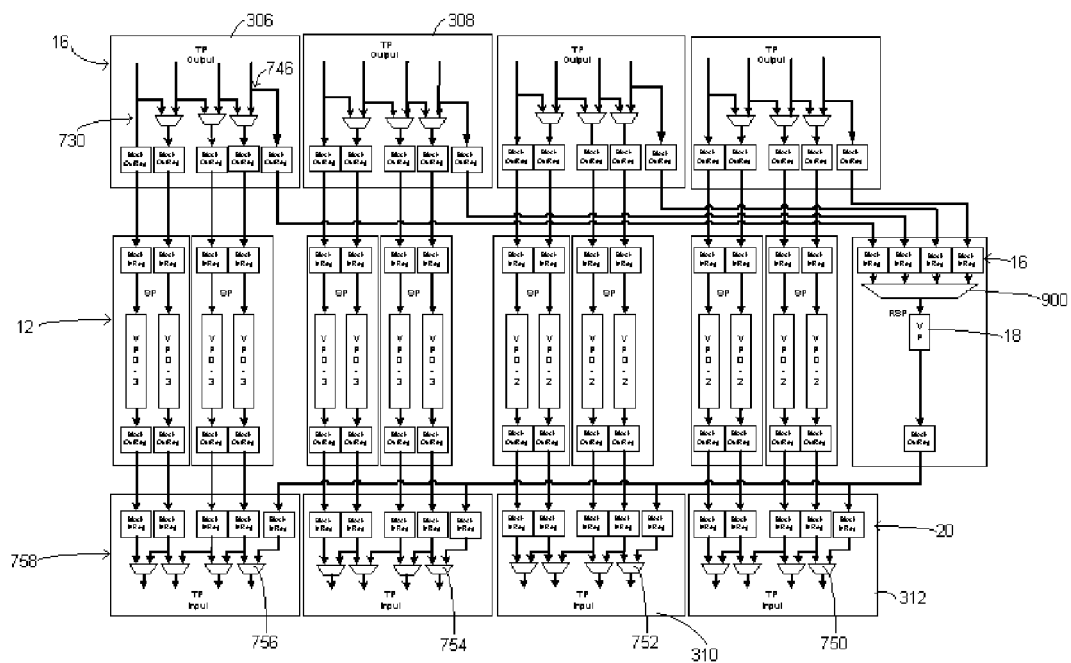
FIG. 9 is a block diagram illustrating one example of an apparatus with circuit redundancy in accordance with one embodiment of the invention.

Referring to FIGS. 7, 8, and 9, one embodiment of an apparatus with circuit redundancy is shown as applied to a single SIMD or a set of parallel ALUs. The shifting logic is different for each of the corresponding portions of the graphics processing functions to be performed although the operations are performed by the same set of parallel ALUs. For example, FIG. 7 illustrates an embodiment where the input data is coming from the SPI 608 and 610. FIG. 8 illustrates an embodiment where the input data is coming from the vertex cache or sequencer. FIG. 9 illustrates an embodiment where the input data is coming from the texture pipeline to the set of parallel ALUs. As shown, only one ALU serves as the redundant unit.

As shown, there are banks of data buffers 710, 712, 714 and 716 to suitably buffer data as it is being output or input by any suitable stage. Likewise the buffers are also included in the redundancy logic 620. As will be recognized, the redundancy logic 620 uses a common redundant parallel ALU 18 but with different multiplexing circuitry as needed as shown for example in FIG. 7 and FIG. 9. As shown in FIG. 8, the shifting logic circuitry (including multiplexing circuitry) are slightly different from that shown in FIGS. 7 and 9. As also shown in these diagrams each of the ALUs has an independent input data path generally shown as 720.

With respect to FIG. 7, the input data shifting logic 16, in this example, includes a bank of redundancy multiplexors 730 for each of a plurality (here shown as two) of input streams to a neighboring ALUs. These redundancy multiplexors are generally shown individually as 732. Each of these redundancy multiplexors are two-to-one multiplexors which can select between one of two neighboring input streams for output to a given parallel ALU. In addition, the redundancy multiplexors 730 include subset multiplexors 734 and 736 for each subset group. For example, in this embodiment, 4 ALUs define a group or subset and 2 subsets are grouped through subset multiplexor 734 and 736. The output of the subset multiplexor 734 and 736 are coupled to provide input to a redundancy selection multiplexor 740 whose output provides the input to the redundant parallel ALU 18. As is also shown, an end ALU in a subset, such as ALU 742 and 744 have their input streams 746 and 748 coupled to subset multiplexor 734 and the multiplexor 732. As such, the end ALU input data is shifted to the redundant parallel ALU 18, if for example, one of the ALUs within the subset is defective.

Also, although not shown, the defective ALU detection logic 34 is operatively coupled to provide control data (e.g. signals) to each of the multiplexors in the shifting logic. In this example the redundancy selection multiplexor 740 is included as part of the shifting logic 16.

In the output data shifting logic 20, each of the end multiplexors 750, 752, 754 and 756 are coupled to the output of the redundancy ALU to realign data normally output by the end ALU. In addition a similar bank of multiplexors 758 is illustrated in the output shifting logic wherein each of the multiplexors 758 is coupled to an output of two neighboring ALUs in the set of ALUs and that receive control data from the defective ALU detection logic 34 to suitably control the shifting of output data if the redundant parallel ALU 18 is used.

FIG. 8 shows another embodiment wherein a 4 to 1 redundancy multiplexor 800 is used that is operatively coupled to receive input data for an end ALU in a subset for all of the end ALUs in the set of parallel ALUs. In addition the redundancy multiplexor 740 shown in FIG. 7 has its functionality carried out for example by the redundancy multiplexor 800.

FIG. 9 is another embodiment showing that the subset multiplexor 800 or subset multiplexors 734 and 736 may be implemented for example as multiplexor 900 again depending upon the requirement of the stage providing the input data to the set of parallel ALUs. For example, additional delay may be required or buffering may be required depending upon any particular implementation. For example, a 4-to-1 multiplexor is used whose input is operatively coupled to receive input data for an end ALU in each of a plurality of subsets of ALUs. Similarly, the output data shifting logic also includes a multiplexor that receives the output of the redundant ALU. As shown in FIG. 9 each quad of ALUs may be in a different physical block on a chip and as such the shifting logic on both the input path and the output path are provided as shown.

For example, with respect to FIG. 7, it can be assumed that each SPI block has eight 128 bit input data busses for respective SPs for a total of 16×128 bit bus connections wherein each 128 bit bus is used to load either vertex or pixel input vector data into a respective set of GPRs within the ALUs. The redundant bus should contain the last pixel and vertex data item for a quad subset that contains the bad ALU.

In a similar fashion the shader processor (SP) and shader export (SX) blocks shown for example in FIG. 7 may have 16×128 bit data busses that carry position, color or parameter cache write attribute data. The redundant ALU outputs on one 128 bit buss that connects to the SX. The SX block multiplexes the redundant output data with the parallel ALU output data pipes to realign the output data in the group containing the defective ALU to realign the output for further processing.

As shown, two sets of two-to-one multiplexors are used with respect to the SPI input to facilitate suitable synchronization and timing. As shown in FIG. 8, a single 4-to-1 multiplexor 800 is used for the sequencer or vertex cache whereas as shown in FIG. 9, a 4-to-1 multiplexor 900 is used after the register bank. As previously noted, the various block-in registers and block-out registers may be needed to physically route data because of delays in routing on a chip and some may be eliminated or additional ones may be added if desired.

As also shown in FIG. 11 (fuse and register tables) the rom_bad_pipe_fuse register shows the register bits for controlling the shifting by indicating which ALU is defective. For example, the register bits 1002 selects which vertical slice of pipe has the defect in it and register bits 1006 select the SIMD that is defective thereby indicating for example a row and column designation of the defective ALU where a two dimensional array is employed. Register bits 1004 are set to indicate whether to enable a redundant SP usage in the event a redundant ALU is necessary.

The corresponding ROM_BAD_PIPE_DISABLE REGISTER 1100 provides a runtime control of the redundant unit so if no fuses are blown the redundancy use is under program control by logically OR'ing the enables and muxing the pipe and SIMD selects with the fuse bits.

Figure 10:
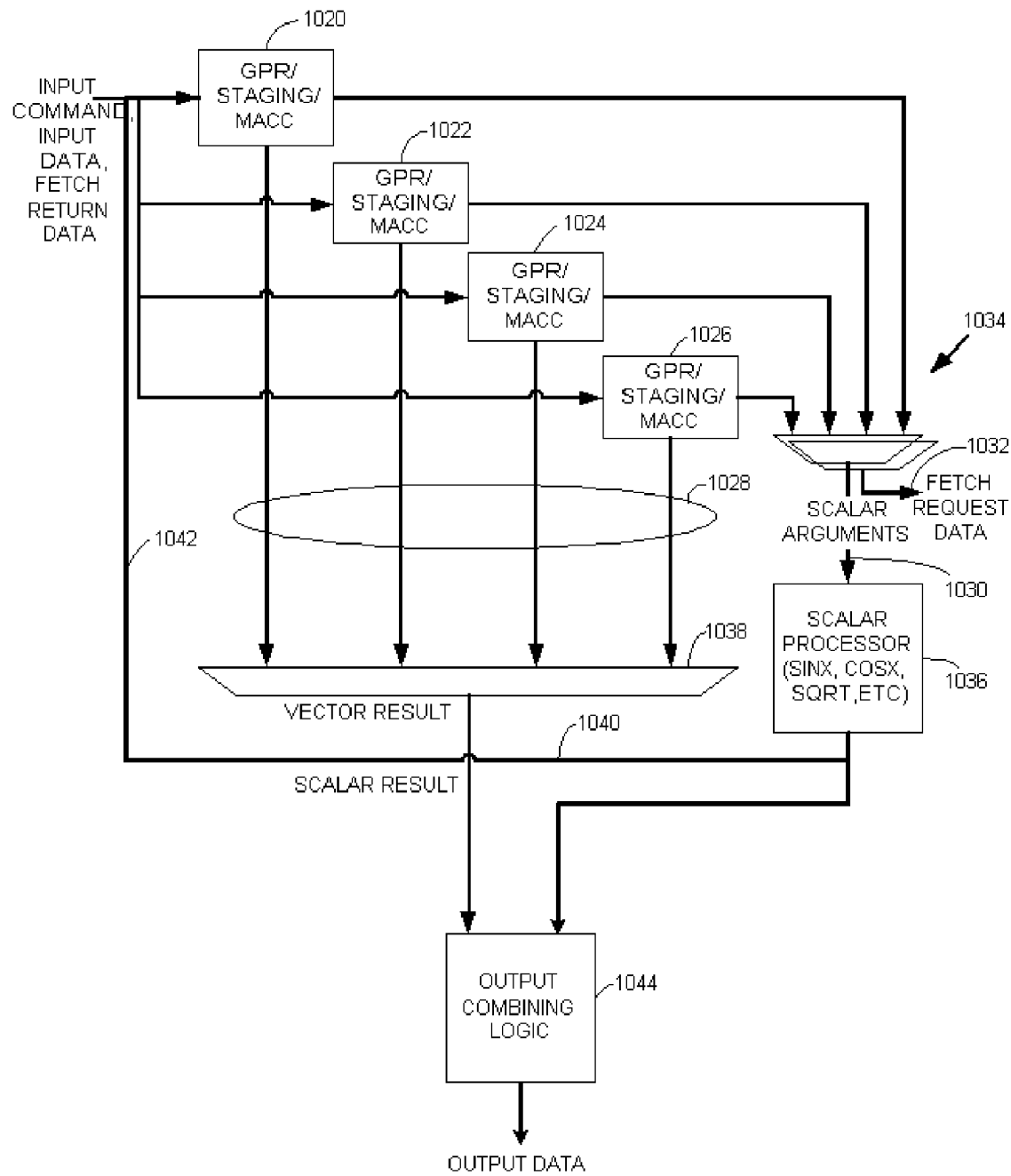
FIG. 10 is a block diagram illustrating one example of an ALU, such as a vector scalar processor.

FIG. 10 illustrates in a functional block diagram form, one example of an ALU such as a vector scalar processor (VP) shown for example in FIG. 6. The ALU includes 4 modules that contain a GPR (general purpose register file), staging logic and a MACC (multiply and accumulate processor). As shown, 4 elements may be processed at one time. The modules are shown as 1020, 1022, 1024 and 1026 and they output vector results 1028, scalar arguments 1030 and fetch addresses 1032. As shown, the vector results 1028 are time multiplexed using mux logic 1038 and combined 1042 with scalar results 1040 to write back to the GPRs and create output data by output combining logic 1044. The scalar arguments and fetch address are time multiplexed, via mux logic 1034 to provide data to the scalar engine 1036 and the fetch resources. However it will be recognized that any suitable ALU may be employed.

In one embodiment, fuse bits (1002-1006 of FIG. 11) are used by the defective ALU detector control logic to select and set the multiplexors to suitably shift the data to neighboring ALUs and then to the redundant ALU.

In an alternative embodiment, the fuse bits are not used but instead dynamic selection and control of the shifting multiplexors may be performed wherein, for example, the input data 14 may include an indication of which ALU is to receive the data and a comparison is then made by the defective ALU detection logic by evaluating a register that contains data representing which ALU is defective. If the information is destined for the defective ALU, the defective ALU detection logic 34 then suitably switches and controls the shifting logic and associated multiplexors to facilitate the shifting and activation of the redundant parallel ALU 18 as needed. This may be carried out on a dynamic basis for each data set being loaded into the set of parallel ALUs, if desired.

As noted above, in one embodiment the data is shifted to a neighboring ALU but not to all ALUs in the set since subsets are designated to limit the amount of shifting and hence reduce the number of wired connections necessary to route the information to a suitable redundant ALU. Moreover due to physical locations of the next neighboring ALU on a chip, shifting to all neighboring ALUs may add too much delay. Accordingly the grouping of ALUs and subsets is utilized, in one embodiment. In other words, a set of ALUs is partitioned into input groups associated with a subset of ALUs. In addition as noted above, the shifting logic may shift the data to multiplexing logic or switching logic which then suitably routes the shifted input data to the parallel redundant ALU.

FIG. 13 illustrates one example of graphics processing logic 1300 that employs, as previously described, a two-dimensional array of parallel ALUs such as those described with reference to FIG. 4. In this example, the plurality of parallel ALUs operate as vector processors for both pixel data and vertex data to form a unified shader structure. However, it will be recognized that any suitable vector processor structure may be employed. In this example, a subset of ALUs will be described as being a subset of four (a quad) processors and as previously described with reference to FIG. 6, the system may include sixteen ALUs for a given set or SIMD processor. The graphics data processing logic 1300 also includes clock control logic 1302 that provides suitable clock signals 1304 to each of the parallel ALUs 22, 24, etc. The clock control logic 1302 receives control data 1306 from a register set 1308 which is a programmable storage element such as RAM, ROM or any suitable storage element. The graphics data processing logic 1300 also includes parallel ALU data packing logic 1310 that packs input data according to received control data 1304 in order to determine, in one example, which subset of parallel ALUs it is to pack data for. As such, the parallel ALU data packing logic 1310 provides selected packed data 1312 to the appropriate subsets or sets of ALUs of a given SIMD.

In this example, the parallel ALUs are grouped in subsets as noted above and the programmable storage element 1308 contains data representing which groups of the parallel ALUs are not to receive data (get disabled). This data is shown as pixel disable data 1320 and vertex disable data 1322.

Since any row of parallel ALUs may perform vector operations, in this example, the programmable storage element includes a register set 1200 (e.g. see FIG. 12) that stores data indicating which of the ALUs is to be disabled from performing pixel processing and which ALUs in a row or set should be disabled for vertex data processing. As shown in FIG. 16, for example, fuse bits 1007 (see FIG. 11) indicate defective ALUs and a user can control register 1200 to control remaining ALUs. As shown, OR logic 1600 receives bits indicating fuse bits for defective ALUs and also receives disable bits from register set 1200 that are, for example, user selectable for deactivating those ALUs that have not been deactivated by the fuse bits 1007. As such, the vertex disable data 1322 represents whether a plurality of ALUs (for example, a subset) are not to be used for vertex processing. Likewise, the pixel disable data 1320 indicates which subset of ALUs are not to be used for pixel processing (or shading).

The parallel ALU data packing logic packs data only for the plurality of arithmetic logic units identified by the pixel disable data and vertex disable data 1320 and 1322, respectively as being enabled. The programmable storage element 1308 in this example is shown to include a pixel processing control register 1330 and a vertex processing control register 1332. The pixel processing control register 1330 contains data representing which subset of ALUs should not be used for pixel processing, otherwise shown as pixel disable data 1320. The vertex processing control register 1332 stores the vertex disable data 1322 which indicates which subsets of ALUs, for example in a given row or a given SIMD should not be used to process vertex data at a given time. The pixel processing control register 1330 and the vertex processing control register 1332 may be suitably programmed through a software driver executing on a host processor or any other suitable processor. The software driver may determine which subset of processors or set of ALUs should not be used depending upon, for example, user selected performance data which may be entered, for example, through a suitable graphic user interface as provided by the driver or may be set at the factory in performance level control registers. The determination of which ALUs are not to be used may be done after testing a particular ALU to see if it is operational. For example, if an ALU is defective (indicated by fuse bits 1007 in FIG. 11) or if processing levels can be reduced, the subset to which the ALU belongs may be excluded from operation so that the defect does not cause the entire chip or die to be discarded. Alternatively, the parallel ALUs may be dynamically disabled during normal operation as needed depending upon the amount of data to be processed. This may be done using any suitable known technique for determining a particular work load of one or more ALUs at any given time.

When power reduction is the goal, the clock control logic 1302 is operatively coupled to each of the plurality of parallel ALUs to disable the plurality of ALUs if both the pixel disable data and the vertex disable data indicate to disable the plurality of ALUs. As such, the clock signals 1304 may be disabled depending upon the desired level or type of power consumption to be used.

FIG. 14 illustrates one example of a method for processing graphics data that may be carried out, for example, by the apparatus shown in FIG. 13 or any other suitable structure. As shown, the logic 1300 stores, as shown in block 1400, data for a plurality of parallel arithmetic logic units belonging to a SIMD, such as a subset of parallel ALUs that operate as a vector processor on at least one of pixel data or vertex data or both. The data represents which of the plurality of ALUs within the SIMD are not to receive data for processing in a given point in time. The storing, for example, is done by the programmable storage element under suitable driver control (e.g. host processor control). As shown in block 1402, the method includes packing data only for the plurality of parallel ALUs identified by the stored data so as to reduce the labor of the parallel ALU data packing logic 1310. The parallel ALU data packing logic 1310 serves as a row packer and packs data to go to, in one example, a row of quad ALUs based on the register values in the programmable storage element 1308 that indicate which quads are active (or inactive). As used herein, it will be recognized that data representing which parallel ALUs are not to receive data may be shown by data indicating which ALUs are to receive data. As shown in FIG. 13, the clock control logic 1302 may be duplicated for each subset of parallel ALUs or quad set of parallel ALUs in this example. However, any suitable clock control logic may be used.

FIG. 15 is a functional block diagram showing one example of graphics processing logic in accordance with one embodiment of the invention as applied to a multiple SIMD graphics shader processing scheme as discussed earlier with reference to FIG. 6. In this example, a set of ALUs 1500 is shown that is defined by four quad ALUs also referred to as vector processors as might be implemented for example as described with reference to FIG. 10, or any other suitable logic that operates as a vector processor on pixel data or vertex data or performs functions for both types of processing. As shown, the logic includes a vector processor array 1502 similar to the type, for example, as shown in FIG. 6.

The graphics processing logic also includes ALU subset disable logic 1504 which is employed instead of the clock controller logic 1302 of FIG. 13. In this embodiment, instead of using the clock signal to disable the suitable quad parallel ALUs, an enable signal may be used to disable the appropriate quad or individual ALU in a parallel set of ALUs. The ALU disable logic 1504 produces, in this example, a quad ALU disable signal 1506 to disable an entire quad of parallel ALUs in a SIMD.

In this example, the parallel ALU data packing logic 1310 includes a pixel data packer 1510, a vertex data packer 1512, a load arbitration block 1514 and a SIMD controller 1516. As shown, each of the pixel packers and vertex packers 1510 and 1512 pack data for a row of parallel processing units, in this case, for each individual SIMD. As such, the data packers receive respective pixel data and vertex data. As shown, the vector processors serve as the unified shaders since they process both pixel and vertex information. The pixel data packer 1510 is operatively coupled to the pixel processing control register 1330 to receive the register data stored in the pixel processing control data so that the pixel packer logic 1526 can determine whether particular pixel data that is being received associated with a particular SIMD_ID should be packed in the next available quad memory 1528. As such, the logic 1526 determines if there is a pixel quad disable bit(s) 1320 in a quad register and if so, the pixel data incoming for the particular quad is not packed into the corresponding memory section of memory 1528. Logic 1526 determines a SIMD to load data for and reads the pixel processing control register and the vertex processor control register for the SIMD via muxes 1570 and 1572. The memory 1528 is divided into quad memory sections, one section for each quad processors. If the quad is defective, the data originally destined for the defective quad is packed in a neighboring memory section or if the row is full, then the unpacked data will be packed for another SIMD.

Similarly, the vertex packer 1512 also includes associated logic 1528 that also determines whether data in the vertex processing control register 1332 contains vertex disable data for a particular quad in a particular SIMD. If the logic 1530 determines that a disable bit has been set for a given quad for a particular SIMD, data associated with that quad for that particular SIMD is not packed in memory 1532. When a row is full it is passed for arbitration. The packed data from each of the pixel data packer and vertex data packer, shown as 1540 and 1542 respectively, is then passed to the load arbitration logic 1514 and multiplexing logic 1546 for output to the appropriate SIMD. The vertex packer and pixel packer 1512 and 1510 send appropriate load identification data 1550 and 1552 to notify the load arbitration logic that a particular SIMD and associated data is available for output so that the load arbitration control logic 1554 may control the multiplexor 1540 in, for example, a round robin fashion, to ensure that the appropriate data is loaded into the appropriate SIMD. The SIMD controller 1516 is controlled by the arbitration control logic 1540 to allow passing of the appropriate data from the appropriate data packer into the appropriate group of parallel processors.

The ALU disable logic 1504, in this example, includes AND logic 1560 operatively coupled to the pixel processing control register 1330 and the vertex processing control register 1308 and controls which quad or subset of parallel ALUs need to be disabled. This may be done in any suitable manner and in this example, the AND logic 1560 only disables those quad portions of a SIMD that are identified as not being allowed to receive data according to the pixel disable data and vertex disable data 1320 and 1322. Also if desired, the AND logic 1560 may receive data representing global power management enable indicated as 1564 which serves to also disable quad processors, if desired.

Referring to FIG. 6, parallel ALU control for pixel processing and vertex processing may be done using fusible links in addition to or instead of the programmable registers if desired as noted above. In any event, the programmable registers when used, cause the VGT logic 604, the primitive assembly logic 616, the scan converter 614 and the sequencer 606 to prevent any valid data from entering their respective pipelines. In one example, the VGT logic alters vertex reuse parameters appropriately for the number of quad pipes available in an active SIMD. The VGT logic also determines when a vertex vector memory stage will be full according to the number of available pipes. The VGT logic 604 also assigns the vertex vectors to the active SIMD in a round robin fashion. As such, the load arbitration logic 1514 may be implemented in the sequencer logic which knows both vertex and pixel data loads, or in any other suitable logic, if desired. Also as shown in this example, there is a disable bit for each quad subset of ALUs for each SIMD. One simplified approach to vertex reuse may require that the number of disable bits set for each SIMD must be equal unless it is desired to disable an entire SIMD by setting all of the quad disable bits for that SIMD.

The sequencer 606 instructs the SPI 608 or 610 to load vertex staging registers but to skip the defective pipes. The primitive assembly logic 616 may request position data from the export memories from the SX when necessary. Any disable quad subsets and their respective output data will not be stored in the export memories and the PA request will skip over them based on the disable registers. The scan converter 614 or other structure that provides the data, only steers data into valid quads of valid SIMDs. The scan converter 614 also assigns the SIMD_ID to pixel vectors in a round robin fashion.

As such, among other advantages, the above operation provides for programmable control and packing of data to parallel arithmetic logic units that operate as a vector processor on at least pixel data or vertex data or both and may also facilitate suitable control to reduce power consumption when desired. Other advantages will be recognized by those of ordinary skill in the art.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. Graphics data processing logic comprising:
   a plurality of rows of parallel arithmetic logic units that operate as an array of arithmetic logic units on both pixel data and vertex data, wherein the array of ALUs include a plurality of sets of parallel ALUs, each set of said sets comprising at least two parallel ALUs, and including an ALU load arbiter operatively coupled to each of the sets of parallel ALUs and operative to determine the order in which each set of parallel ALUs gets loaded with pixel data or vertex data;
   a programmable storage element containing first data to adapt at last one of an ALU of the ALUs in the plurality of rows of parallel ALUs to perform either pixel data processing or vertex data processing; and
   parallel ALU pixel data and vertex data packing logic operatively coupled to the array of arithmetic logic units and to the programmable storage element and operative to pack pixel and vertex data only for specified arithmetic logic units of the array of arithmetic logic units based on the first data.

2. The graphics data processing logic of claim 1 wherein the parallel arithmetic logic units are grouped and wherein the programmable storage element contains first data indicating which groups of parallel ALUs are not to receive pixel data or vertex data.

3. The graphics data processing logic of claim 1 wherein the programmable storage element stores first data, which includes both pixel disable data indicating whether a plurality of parallel ALUs are not to be used for pixel generation and vertex disable data indicating whether the plurality of ALUs are not to be used for vertex generation and further including clock control logic, operatively coupled to each of the plurality of parallel ALUs to disable the plurality of ALUs if both the pixel disable data and the vertex disable data indicate to disable the plurality of ALUs.

4. Graphics data processing logic comprising:
   a plurality of sets of parallel arithmetic logic units that operate as a vector processor on both pixel data and vertex data;
   a programmable storage element that includes a pixel processing control register and a vertex processing control register wherein the pixel processing control register stores pixel disable data indicating whether one or more of the plurality of sets of parallel ALUs are not to be used for pixel generation and wherein the vertex processing control register includes vertex disable data indicating whether one or more of the sets of parallel ALUs are not to be used for vertex generation and further including clock control logic, operatively coupled to each of the plurality of parallel ALUs to disable a set of parallel ALUs if the both the pixel disable data and the vertex disable data indicate to disable a set of parallel ALUs; and
   parallel ALU data packing logic, operatively coupled to the plurality of arithmetic logic units and to the programmable storage element, that includes a vertex data packer and a pixel data packer each operative to pack respective vertex or pixel data only for the set or sets of arithmetic logic units identified by the data indicating which of the plurality of arithmetic logic units that are selected to receive either of pixel and vertex data for processing.

5. The logic of claim 4 wherein the each set of parallel ALUs is a single instruction multiple data (SIMD) processor.

* * * * *